United States Patent Office 3,658,970
Patented Apr. 25, 1972

3,658,970
INJECTABLE LAURIC ACID
John McClure Carroll, 1421 Royal St.,
Kissimmee, Fla. 32741
No Drawing. Filed July 23, 1969, Ser. No. 844,193
Int. Cl. C08h 17/36
U.S. Cl. 424—318
12 Claims

ABSTRACT OF THE DISCLOSURE

A process for preparing crystalline lauric acid in dosage form suitable for parenteral injection into mammalian tissue. An aqueous suspension of lauric acid crystals of a particle size ranging between 0.01 and 5 microns is formed by mixing lauric acid and water, and preferably a dispersing agent or surfactant, and subjecting the mixture to intense agitation.

This invention relates to a novel process for reducing crystalline lauric acid to dosage form, and more particularly, to reducing lauric acid to a particle size suitable for inclusion in a pharmaceutical preparation for administration by means of parenteral injection.

Lauric acid is a saturated fatty acid which is found in nature as a glyceride. It constitutes a proportion of the component acids of several vegetable oils, including coconut oil, palm kernel oil and palm oil. It can be readily extracted by saponification, acidification, alcoholysis and other chemical techniques from these natural sources. In addition, a number of methods have been developed for the synthesis of lauric acid. The product derived from each of these methods is a solid, and is usually in the form of a white crystalline powder.

It has recently become desirable to administer lauric acid to mammals as a prophylactic and therapeutic agent. Lauric acid is suitable for oral consumption. However, because of its large crystal size, it is not in a form effective for inoculation of mammals.

Lauric acid in the form presently available has several distinct disadvantages when used for parenteral inoculation. For instance, it cannot be administered to mammals incapable, for some reason or another, of oral intake or to ruminants, such as sheep, goats, deer, camels and other cattle that chew the cud and have a complex stomach with several cavities. While conventional lauric acid can be injected if combined with a carrier in which the acid is soluble, such as ethanol and ether, there are several disadvantages to known solvent-carriers, the most important of which is hypertoxicity.

These disadvantages may be overcome by the use of a more effective carrier, without regard to solubility of the acid, by preparing lauric acid as an injectable dispersion of small crystals. However, it was not heretofore thought possible to reduce lauric acid to a particle size small enough to be administered parenterally.

Accordingly, the object of the present invention is to provide a method which effectively reduces the particle size of lauric acid crystals to a dosage form suitable for parenteral injection into mammalian tissue.

It has now been found that a suspension of lauric acid suitable for injection into mammalian tissue may be prepared by (1) forming a mixture of lauric acid and an aqueous medium, and (2) subjecting the mixture to intense agitation under conditions which provide lauric acid as crystals having a particle size ranging between 0.01 and 5 microns. Preferably, the mixture formed at (1) above also includes either a volatile, water-immiscible dispersing agent or a surfactant to assist in the formation of the fine lauric acid crystals.

The suspension of lauric acid crystals obtained by the present process must be kept at temperatures below the melting point of lauric acid to insure stability. At temperatures above this point, the small crystals of lauric acid coalesce to form larger crystals on cooling.

It has been found that when the average crystal size of lauric acid exceeds about 5 microns, the suspensions are not readily injectable. A crystal size smaller than 0.01 micron would, of course, be acceptable, but this minimum value represents the smallest size obtained by the present process.

The dispersing agent and the surfactant perform essentially the same function. Both substances are used to distribute the lauric acid in fine droplets as a discontinuous phase throughout a continuous aqueous phase.

In accordance with one preferred embodiment of the invention, a volatile water-immiscible dispersing agent is combined with lauric acid and then with water at temperatures below the melting point of lauric acid. Consequently lauric acid should be soluble in the dispersing agent which is added in sufficient quantity, preferably equal proportions with the acid, to provide a water-immiscible lauric acid solution capable of being dispersed as fine droplets throughout an aqueous phase. The dispersing agent has sufficient volatility to allow its evaporation from each droplet during the agitation procedure, leaving the lauric acid suspended as fine crystals throughout the aqueous medium.

Ethyl ether has been found to be a particularly effective volatile water-immiscible dispersing agent for the purpose of my invention.

In a second embodiment of the invention, a surfactant is supplied to the mixture or lauric acid and water by adding it either to the lauric acid or to the aqueous phase. The mixture must be heated to a temperature at which lauric acid is liquid. A small amount of the surfactant suffices to disperse the lauric acid droplets in the aqueous phase. If the heated mixture is then continually agitated while cooling to a temperature below the melting point of the acid, fine lauric acid crystals will form in the presence of suitable surfactants include dioctyl sodium sulfosuc- surfactants are essentially non-toxic and may be left in the suspension without any undesirable side effects. Examples of suitable surfactants include dioctyl sodium sulfosuccinate (Aerosol OT) and polyoxylalkylene derivatives of sorbitan monooleate (Tween 20), monostearate (Tween 60) and monooleate (Tween 80), particularly polyoxyethylene sorbitan monooleate.

The mixing operation must be carried out at an intensity forceful enough to effectively accomplish the formation of lauric acid crystals within the prescribed range. While ultrasonic sound waves as a source of energy for the agitation procedure is preferred, other conventional techniques, such as homogenizer or grinding apparatus would, in fact, be much more economical, and perhaps safer, than the use of an ultrasonic sound wave source; however, sonochemical techniques result in greater uniformity of particle size, and consequently, an end product of finer quality.

Water and lauric acid should be added in such proportions as may readily be determined for the mammal being treated; however, satisfactory results are obtained when from about 10 to about 20 milliliters of water are present for each gram of acid.

In one embodiment of the present invention, lauric acid is dissolved in about an equal amount by weight of a volatile dispersing agent. Water is added and the resulting mixture is subjected to a source of ultrasonic sound waves at a frequency ranging between 18,000 and 22,000 cycles/ second and at an intensity ranging from 8 to 12 watts/ square centimeter. Ethyl ether is an effective dispersing agent for the present process in an amount of approximately 40% to 60% by weight of the acid. The temperature during agitation should range between 10° C. and 40° C. The mixing operation is continued while maintaining the mixture within this temperature range until all the ether has evaporated. A stable, aqueous suspension of pure lauric acid crystals, ranging in particle size from 0.01 to 5 microns remains. Microscopic examination of the suspension by polarization reveals that the crystals present exhibit a birefringence of the same order as lauric acid.

In another embodiment, a suitable aqueous suspension of lauric acid may be prepared according to the present invention as follows: (1) forming a mixture of lauric acid, water and about 0.01 to about 0.1 percent of a surfactant by weight of the acid at a temperature at which the acid is liquid, (2) subjecting the mixture to intense agitation to distribute the lauric acid and surfactant as a discontinuous phase of fine droplets throughout the continuous aqueous phase, (3) cooling the mixture to a temperature below the melting point of the acid, preferably within 10° C. and 40° C. while continuing the agitation to crystallize the fine droplets of lauric acid.

The following examples illustrate the process of the present invention, but are not intended to limit its scope in any way. All parts and percentages are by weight unless otherwise indicated.

EXAMPLE 1

1 gram of lauric acid (average crystal size approximately 300 microns) was dissolved in 1.5 ml. ethyl ether and 15 ml. of water were added. The resulting mixture was placed in the chamber of a Branson sonifier and ultrasonic waves at a frequency of 20,000 cycles/sec. and an intensity of 12 watts/sq. cm. were then passed through the chamber. The agitation operation was continued for 30 minutes at 35° C., until all ether was driven off, and a residue of pure lauric acid crystals in water remained. The average crystalline particle size was determined by microscopic examination to be 5 microns making the suspension suitable for injection into mammalian tissue.

EXAMPLE 2

1 gram of lauric acid, 0.1 g. polyoxyethylene sorbitan monooleate and 15 ml. of water were mixed and agitated for 30 minutes at 50° C. according to Example 1. The heated mixture was then cooled to 35° C. and agitation was continued for another 30 minutes. A stable suspension of lauric acid crystals remained. Average crystal size was determined to be 5 microns.

EXAMPLE 3

Example 2 was repeated using 0.01 g. of dioctyl sodium sulfosuccinate. A stable suspension of lauric acid crystals having an average particle size of 5 microns resulted.

I claim:
1. A process for preparing a stable, aqueous suspension which comprises the steps of
  (a) dissolving lauric acid in a volatile, water-immiscible dispersing agent;
  (b) adding water to the lauric acid solution;
  (c) subjecting the resulting admixture to intense agitation; and
  (d) evaporating the volatile dispersing agent, the agitation and evaporating steps being conducted so that a dispersion of lauric acid crystals having a particle size within the range of about 0.01 to 5 microns is provided.

2. A process according to claim 1 wherein the dispersing agent is added in an amount ranging from 40% to 60% by weight of lauric acid.

3. A process according to claim 2 wherein the dispersing agent is ethyl ether.

4. A process according to claim 1 wherein from about 10 to about 20 milliliters of water are added for each gram of lauric acid.

5. A process according to claim 1 wherein the source of energy for the agitation procedure is ultrasonic waves at a frequency ranging from 18,000 to 22,000 cycles/second and of an intensity ranging from 8 to 12 watts/sq. cm.

6. A process according to claim 1 wherein the temperature during agitation is maintained between 10° C. and 40° C.

7. A process for preparing a stable, aqueous suspension of lauric acid which comprises the steps of
  (a) forming a mixture of lauric acid, a surfactant and water at a temperature at which the lauric acid is liquid;
  (b) subjecting the heated mixture to intense agitation to distribute the lauric acid and surfactant as a discontinuous phase of fine droplets throughout a continuous aqueous phase; and
  (c) cooling the mixture to a temperature below the melting point of lauric acid while continuing the agitation to provide lauric acid crystals having a particle size within the range of 0.01 to 5 microns.

8. A process according to claim 7 wherein the surfactant is added in an amount ranging between 0.01 to 0.1 percent by weight of the acid.

9. A process according to claim 7 wherein the surfactant is selected from the group consisting of dioctyl sodium sulfosuccinate and polyoxyethylene sorbitan monooleate.

10. A process according to claim 7 wherein the temperature of the cooling step is maintained between 10° C. and 40° C.

11. A stable, aqueous suspension of lauric acid having a crystal size of from 0.01 to 5 microns.

12. A suspension according to claim 11 which contains from about 0.01 to 0.1 percent of a surfactant.

References Cited

UNITED STATES PATENTS

| | | | |
|---|---|---|---|
| 2,846,351 | 8/1958 | Tarjan et al. | 424—318 |
| 2,870,019 | 1/1959 | Meyer | 99—123 |

FOREIGN PATENTS

| | | | |
|---|---|---|---|
| 107,249 | 5/1967 | Denmark | 424—318 |

LEWIS GOTTS, Primary Examiner

E. G. LOVE, Assistant Examiner

U.S. Cl. X.R.

260—413

PO-1050
(5/69)

UNITED STATES PATENT OFFICE
CERTIFICATE OF CORRECTION

Patent No. 3,658,970                     Dated April 25, 1972

Inventor(s) John McClure Carroll

It is certified that error appears in the above-identified patent and that said Letters Patent are hereby corrected as shown below:

Column 2, line 41, omit "suitable surfactants include dioctyl sodium sulfosuc-" and insert --the surfactant. Due to the small quantity used, most surfactants are essentially non-toxic and may be left in the--; line 46, cancel "monooleate" and insert --monolaurate--.

Signed and sealed this 3rd day of October 1972.

(SEAL)
Attest:

EDWARD M. FLETCHER, JR.
Attesting Officer

ROBERT GOTTSCHALK
Commissioner of Patents